United States Patent
Meier

(10) Patent No.: US 8,830,317 B2
(45) Date of Patent: Sep. 9, 2014

(54) POSITION DEPENDENT REAR FACING CAMERA FOR PICKUP TRUCK LIFT GATES

(75) Inventor: Michael R. Meier, Walled Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 13/303,446

(22) Filed: Nov. 23, 2011

(65) Prior Publication Data

US 2013/0128039 A1    May 23, 2013

(51) Int. Cl.
*H04N 7/18* (2006.01)
*B60R 11/04* (2006.01)
*B60Q 1/00* (2006.01)

(52) U.S. Cl.
CPC .. *B60R 11/04* (2013.01); *B60Q 1/00* (2013.01)
USPC .......................................... 348/143; 348/148

(58) Field of Classification Search
CPC ......... H04N 7/186; H04N 7/18; H04N 7/185; H04N 5/23293; H04N 5/2256; H04N 5/2251; H04N 5/23206; G08B 13/19632; G08B 13/19695; G08B 17/18; B60R 2011/0094; B60R 11/04; B60R 1/00; B60R 1/003; B60R 2300/808; B60R 2300/8006; B60R 16/02; G01C 11/00; G06K 9/00; G03B 17/18
USPC ...................... 348/143, 148, 164, 211.2, 376, 348/E05.026, 135, 36; 340/435, 901; 382/103; 708/200; 396/287
See application file for complete search history.

(56) References Cited

U.S. PATENT DOCUMENTS

| | | | |
|---|---|---|---|
| 6,421,081 B1 * | 7/2002 | Markus | 348/148 |
| 6,919,917 B1 | 7/2005 | Janssen | |
| 7,231,065 B2 * | 6/2007 | Peach et al. | 382/104 |
| 7,236,088 B2 | 6/2007 | Matsukawa et al. | |
| 7,454,128 B2 | 11/2008 | Lang et al. | |
| 2002/0084675 A1 * | 7/2002 | Buchanan et al. | 296/146.8 |

(Continued)

FOREIGN PATENT DOCUMENTS

| | | |
|---|---|---|
| DE | 20018348 | 2/2001 |
| EP | 1452390 | 9/2004 |
| WO | 2008105046 | 9/2008 |

OTHER PUBLICATIONS

International Search Report and Written Opinion for Application No. PCT/US2012/065975 dated Feb. 13, 2013 (12 pages).

*Primary Examiner* — David Czekaj
*Assistant Examiner* — Dramos I Kalapodas
(74) *Attorney, Agent, or Firm* — Michael Best & Friedrich LLP

(57) ABSTRACT

A rear camera system for a vehicle with a rear-lift door including a camera unit mounted on the rear-lift door, the rear-lift door having open and closed positions, the camera unit having a first field of view when the rear-lift door is in the open position and a second field of view when the rear-lift door is in the closed position, the first and second fields of view overlapping in a shared field of view; a sensor configured to indicate when the rear-lift door is in the open or closed position; a controller configured to receive image data from the camera unit, determine whether the rear-lift door is in the open or closed position based on a signal received from the sensor, and adjust the image data to primarily include the shared field of view based on whether the rear-lift door is in the open position or the closed position.

12 Claims, 4 Drawing Sheets

(56) References Cited

U.S. PATENT DOCUMENTS

| | | | |
|---|---|---|---|
| 2004/0119823 A1* | 6/2004 | Takagi et al. | 348/148 |
| 2007/0025723 A1* | 2/2007 | Baudisch et al. | 396/287 |
| 2007/0185946 A1* | 8/2007 | Basri et al. | 708/200 |
| 2008/0143833 A1* | 6/2008 | Yanai et al. | 348/148 |
| 2009/0000196 A1 | 1/2009 | Kollar et al. | |
| 2009/0040300 A1* | 2/2009 | Scribner | 348/143 |
| 2009/0092284 A1* | 4/2009 | Breed et al. | 382/103 |
| 2010/0060737 A1 | 3/2010 | Lin et al. | |
| 2010/0171826 A1* | 7/2010 | Hamilton et al. | 348/135 |
| 2010/0208032 A1* | 8/2010 | Kweon | 348/36 |

* cited by examiner

POSITION DEPENDENT REAR FACING CAMERA FOR PICKUP TRUCK LIFT GATES

BACKGROUND

The present invention relates to rear-facing cameras for vehicles, in particular rear-facing cameras for attaching to a moveable element such as a lift gate.

Existing vehicle systems include rearward facing video cameras to assist a driver with tasks associated with operating the vehicle in reverse (FIG. 4). In some pick-up trucks, the camera is installed in the lift gate of the truck. As such, when the lift gate is closed and in the "up" position, the camera functions as intended. However, when the lift gate is opened and in the "down" position, the camera is pointed directly at the road surface and is unable to provide any useful information to the driver (FIG. 5).

SUMMARY

In one embodiment, the invention provides a rear camera system for a vehicle with a rear-lift door. The system includes a camera unit mounted on the rear-lift door, the rear-lift door having an open position and a closed position. The camera unit has a first field of view when the rear-lift door is in the open position and a second field of view when the rear-lift door is in the closed position, where the first field of view and the second field of view overlap in a shared field of view. The system also includes a sensor configured to indicate when the rear-lift door is in the open position or the closed position. The system further includes a controller configured to receive image data from the camera unit, determine whether the rear-lift door is in the open position or the closed position based on a signal received from the sensor, and adjust the image data to primarily include the shared field of view based on whether the rear-lift door is in the open position or the closed position.

In another embodiment the invention provides a rear camera system for a vehicle with a rear-lift door. The system includes a camera unit mounted on the rear-lift door and positioned at an angle relative to the rear-lift door, where the rear-lift door has an open position and a closed position. The camera unit has a first field of view when the rear-lift door is in the open position and a second field of view when the rear-lift door is in the closed position. The first field of view and the second field of view overlap in a shared field of view, wherein the shared field of view includes a region behind the vehicle. The system also includes a sensor configured to indicate when the rear-lift door is in the open position or the closed position. The system further includes a controller configured to receive image data from the camera unit, determine whether the rear-lift door is in the open position or the closed position based on a signal received from the sensor, crop the image data from the camera unit to primarily include the shared field of view based on whether the rear-lift door is in the open position or the closed position, and display the adjusted image data on a display unit.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
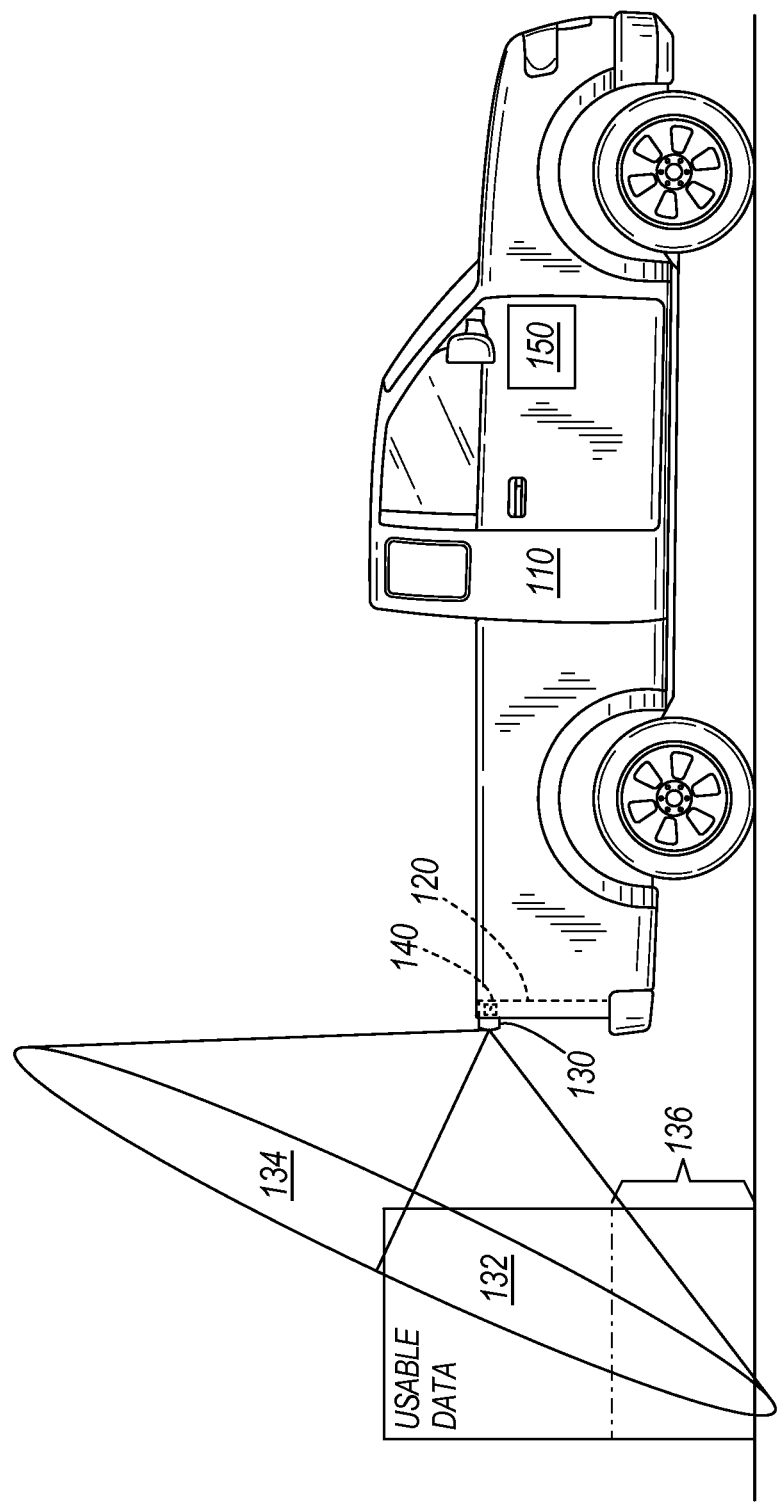
FIG. 1 shows a vehicle with a camera system mounted on a rear-lift door, where the rear-lift door is in the closed position.
Figure 2:
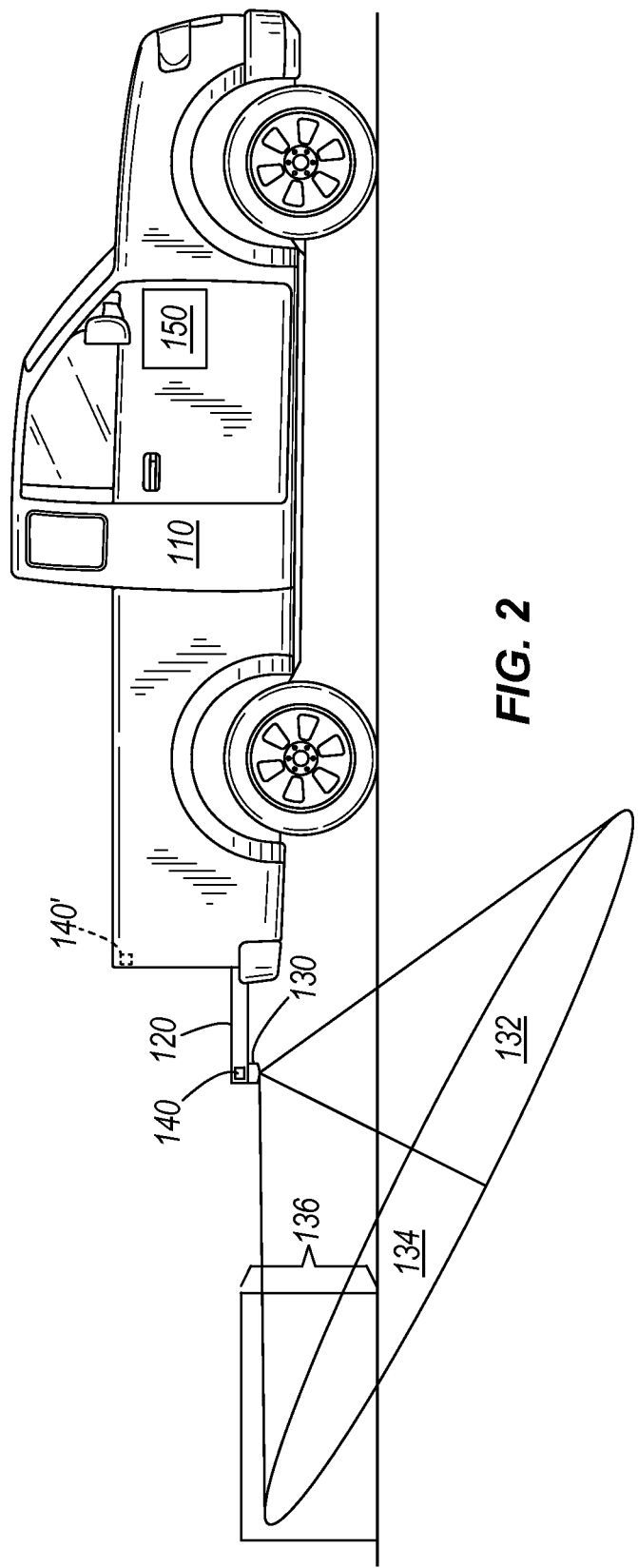
FIG. 2 shows a vehicle with a camera system mounted on a rear-lift door, where the rear-lift door is in the open position.
Figure 3:
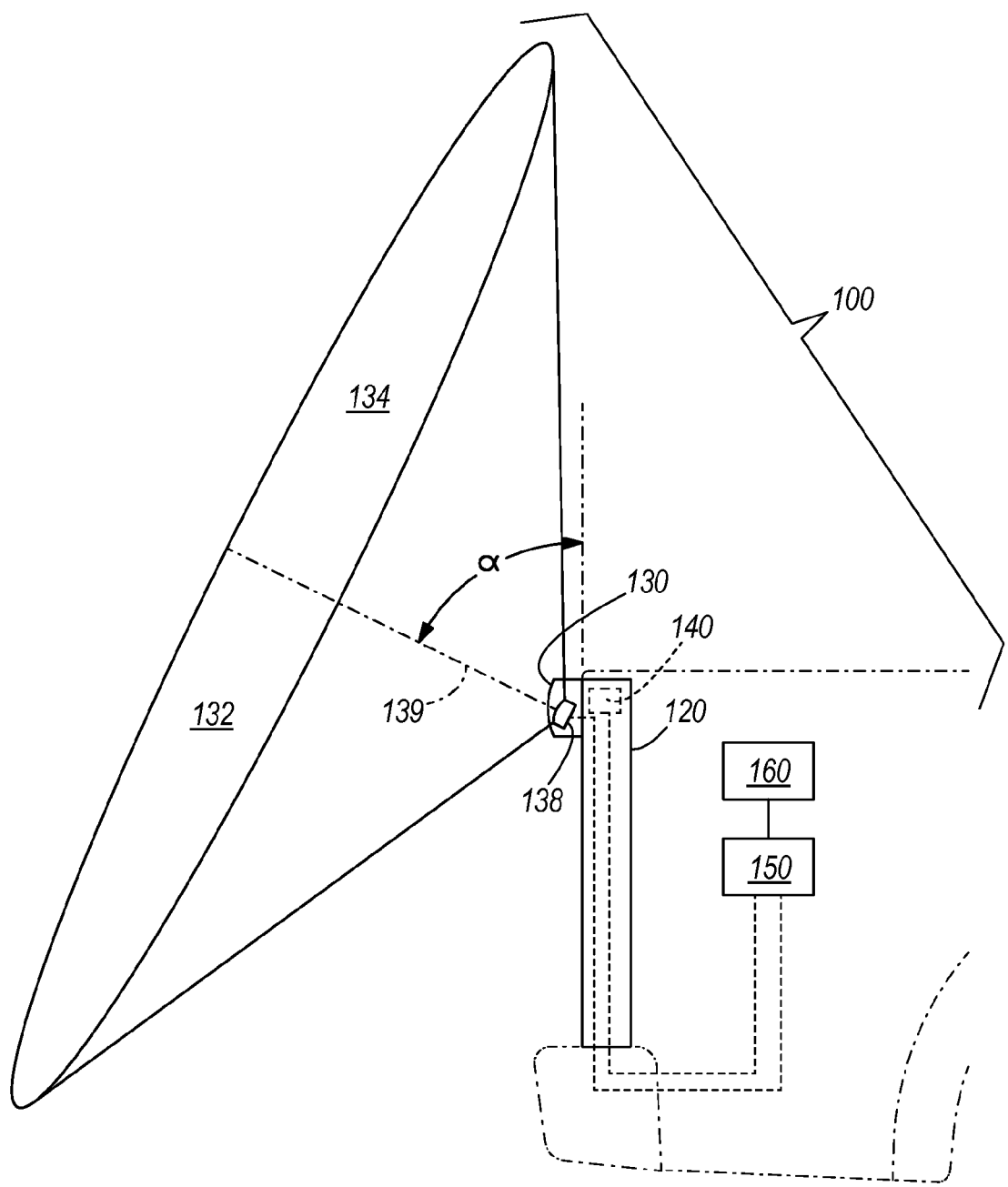
FIG. 3 shows an embodiment of a camera system attached to a rear-lift door.
Figure 4:
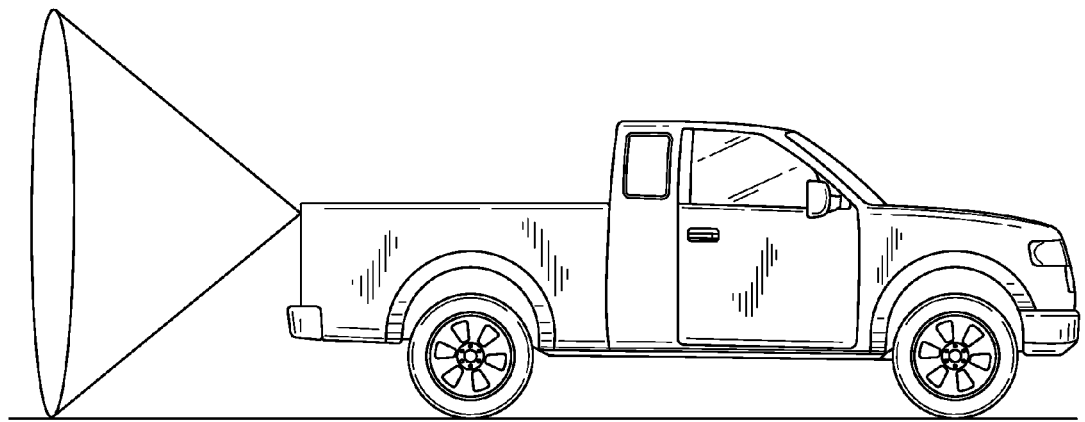
FIG. 4 shows an existing vehicle with a camera attached to a rear-lift door, where the rear-lift door is in the closed position.
Figure 5:
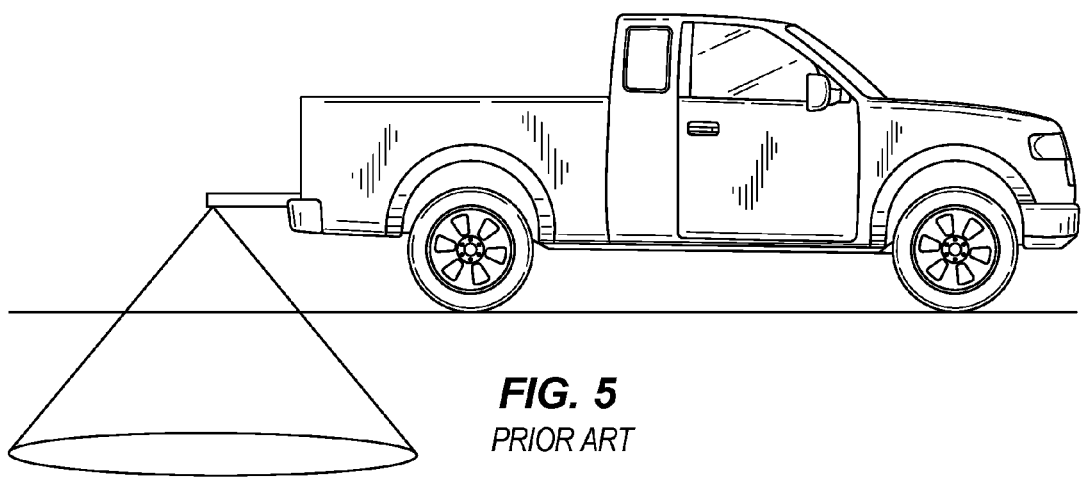
FIG. 5 shows an existing vehicle with a camera attached to a rear-lift door, where the rear-lift door is in the open position.

A camera system 100 for a vehicle 110 with a rear-lift door 120 includes a camera unit 130 mounted on the rear-lift door 120 of the vehicle 110 (FIGS. 1, 3). The rear-lift door 120 has a closed position (FIG. 1) and an open position (FIG. 2). The camera unit 130 has a first field of view 132 when the rear-lift door 120 is in the closed position and a second field of view 134 when the rear-lift door 120 is in the open position (FIGS. 1, 2). The first field of view 132 and the second field of view 134 overlap, at least partially, in a shared field of view 136 (FIGS. 1, 2). In general, the shared field of view 136 is a region behind the vehicle 110, typically at or near ground level, which the driver of the vehicle 110 needs to see when backing up.

The camera system 100 also includes a sensor 140 configured to indicate when the rear-lift door 120 is in the open position or the closed position. The sensor 140 may be associated with the rear-lift door 120, e.g. as part of the camera system 100 or mounted in the door 120 itself, or with the body of the vehicle 110 (FIGS. 1, 2). In one embodiment, the sensor 140 is a level sensor associated with the rear-lift door 120 which detects the orientation of the rear-lift door 120. In various embodiments, the rear-lift door 120 has an outer surface which is in a vertical orientation when the rear-lift door 120 is closed and a horizontal orientation when the rear-lift door 120 is open, although other orientations are possible. In other embodiments, the sensor 140' is associated with a latch mechanism (either on the rear-lift door 120 or the body of the vehicle 110) on the rear-lift door 120 and detects whether the rear-lift door 120 is latched (closed) or unlatched (open).

The camera system 100 also includes a controller 150 (FIGS. 1, 2) configured to receive image data from the camera unit 130, determine whether the rear-lift door 120 is in the open position or the closed position based on a signal received from the sensor 140, and adjust the image data to primarily include the shared field of view 136 based on whether the rear-lift door 120 is in the open position or the closed position. In various embodiments, the controller 150 includes a microprocessor, memory and data storage, input and output communication channels, and a power supply or power input. The controller 150 is connected to the other components of the camera system 100 by suitable wired and/or wireless connections.

In various embodiments, the vehicle 110 can be one of any number of styles of vehicle having a rear-lift door, including for example a sport-utility vehicle, a pick-up truck, a station wagon, a van, a minivan, and a passenger vehicle having a trunk, and where the rear-lift door 120 can include a tail gate, a lift gate, a trunk lid, or a rear hatch cover.

In one embodiment, the camera unit 130 includes a camera 138 (e.g. a video camera) positioned at an angle relative to the outer surface of the rear-lift door 120, where the camera 138 has a sufficiently large field of view to encompass both the first field of view 132 and the second field of view 134 (FIG. 3). The camera unit 130 may include a fish-eye or other type of wide-angle lens to obtain image date from a large field of view in the vertical direction. In one embodiment, the camera unit 130 has a central axis 139 that is oriented at an oblique angle α (e.g. 45°) relative to the outer surface of the rear-lift door 120 (FIG. 3). In another embodiment, the field of view of the camera unit 130 is approximately 120° and the oblique angle α is 60°. In still other embodiments, the camera unit 130 has an expanded field of view in the horizontal direction in order to view the area not only directly behind the vehicle 110 but also in nearby regions.

In various embodiments, the controller 150 receives image data from the camera unit 130, which may include a complete image from the camera 138 encompassing both the first field of view 132 and the second field of view 134. The controller 150 also receives a signal from the sensor 140 to determine whether the rear-lift door 120 is in the open position or the closed position, and adjusts the image data (e.g. by cropping the image) to primarily include the shared field of view 136 based on whether the rear-lift door 120 is in the open position or the closed position (FIG. 3). The controller 150 then displays the adjusted image data on a display unit 160 visible to a driver of the vehicle 110 (FIG. 3).

The controller 150 may display more or less of the shared field of view 136 and in addition may also display other regions of the first field of view 132 and the second field of view 134. In various embodiments, the portion(s) of the first field of view 132 and the second field of view 134 that are displayed on the monitor 136 is factory-set and/or may be adjusted by a user such as the driver of the vehicle 110. In the embodiments shown in FIGS. 1 and 2, the controller 150 may display the lower portion of the first field of view 132, encompassing at least the shared field of view 136, when the rear-lift door 120 is in the closed position (FIG. 1). Conversely, the controller 150 may display the upper portion of the second field of view 134, encompassing at least the shared field of view 136, when the rear-lift door 120 is in the open position (FIG. 1).

Thus, the invention provides, among other things, a camera system to provide useful image information to a driver of a vehicle whether the rear-lift gate is closed or open. The disclosed camera system is well-suited for use in the automotive industry due to its simple but robust design. The use of a single camera with no moving parts provides greater reliability with a lower cost for components and simplified installation. Various features and advantages of the invention are set forth in the following claims.

What is claimed is:

1. A rear camera system for a vehicle with a rear-lift door, the system comprising:
    a camera unit mounted on the rear-lift door, the rear-lift door having an open position and a closed position;
    the camera unit having a first field of view when the rear-lift door is in the open position and a second field of view when the rear-lift door is in the closed position;
    wherein the first field of view and the second field of view overlap in a shared field of view, wherein the shared field of view corresponds to a top portion of the first field of view and a bottom portion of the second field of view, and wherein the shared field of view comprises a region behind the vehicle;
    a sensor configured to indicate when the rear-lift door is in the open position or the closed position; and
    a controller configured to
        receive image data from the camera unit,
        determine whether the rear-lift door is in the open position or the closed position based on a signal received from the sensor,
        crop the image data to primarily include the shared field of view and to remove a bottom portion of the first field of view or a top portion of the second field of view based on whether the rear-lift door is in the open position or the closed position, respectively, and
        display the cropped image data on a display unit.

2. The rear camera system of claim 1, wherein the rear-lift door has an outer surface that is vertical when the rear-lift door is in the closed position, and wherein the camera unit is oriented such that a central axis of the camera unit is at an oblique angle relative to the outer surface of the rear-lift door.

3. The rear camera system of claim 1, wherein the sensor comprises a level sensor to detect an orientation of the rear-lift door.

4. The rear camera system of claim 1, wherein the sensor comprises a switch to detect whether the rear-lift door is latched.

5. The rear camera system of claim 1, wherein the shared field of view comprises a region behind the vehicle.

6. The rear camera system of claim 1, wherein the vehicle is selected from the group consisting of a sport-utility vehicle, a pick-up truck, a station wagon, a van, a minivan, and a passenger vehicle having a trunk.

7. The rear camera system of claim 1, wherein the controller is configured to crop the image data to primarily include the shared field of view.

8. A method of operating a rear camera system for a vehicle with a rear-lift door, the method comprising the steps of:
    providing a camera unit mounted on the rear-lift door and positioned at an angle relative to the rear-lift door, the rear-lift door having an open position and a closed position, the camera unit having a first field of view when the rear-lift door is in the open position and a second field of view when the rear-lift door is in the closed position, wherein the first field of view and the second field of view overlap in a shared field of view, wherein the shared field of view corresponds to a top portion of the first field of view and a bottom portion of the second field of view, and wherein the shared field of view comprises a region behind the vehicle;
    using a sensor, indicating when the rear-lift door is in the open position or the closed position;
    receiving image data from the camera unit;
    determining whether the rear-lift door is in the open position or the closed position based on a signal received from the sensor;
    cropping the image data from the camera unit to primarily include the shared field of view and to remove a bottom portion of the first field of view or a top portion of the second field of view based on whether the rear-lift door is in the open position or the closed position, respectively; and
    displaying the cropped image data on a display unit.

9. The method of claim 8, wherein the sensor comprises a level sensor to detect an orientation of the rear-lift door.

10. The method of claim 8, wherein the sensor comprises a switch to detect whether the rear-lift door is latched.

11. The method of claim 8, wherein the rear-lift door has an outer surface that is vertical when the rear-lift door is in the closed position, and wherein the camera unit is oriented such that a central axis of the camera unit is at an oblique angle relative to the outer surface of the rear-lift door.

12. The method of claim 8, wherein the vehicle is selected from the group consisting of a sport-utility vehicle, a pick-up truck, a station wagon, a van, a minivan, and a passenger vehicle having a trunk.

* * * * *